Patented Oct. 10, 1939

2,175,781

UNITED STATES PATENT OFFICE 2,175,781

PROCESS FOR THE MANUFACTURE OF SODIUM SILICATE DETERGENTS

Walter S. Riggs, Haddon Heights, N. J., and Clarence W. Burkhart, Lansdowne, Pa., assignors to Pennsylvania Salt Manufacturing Company, Philadelphia, Pa., a corporation of Pennsylvania No Drawing. Application March 18, 1937, Serial No. 131,748

5 Claims. (Cl. 87—5)

Our invention relates to a novel process of manufacturing detergent products and to new types of such products, and more particularly it relates to the economical production of products containing alkali sub-silicates which are defined as compounds having a ratio of alkali oxide to silica equal to or greater than 1 to 1. This application is a continuation-in-part of our copending applications Serial No. 15,722, filed April 10, 1935 (now Patent No. 2,083,545), and Serial No. 101,322, filed September 17, 1936.

One object of the present invention is to provide a method by which alkali detergent products containing alkali sub-silicates and, if desired, other materials possessing detergent, water-softening, or buffering properties, can be economically manufactured without resort to expensive equipment and laborious steps such as are now required in the methods employed in the production of compounds of this class.

A further object of our invention is to furnish a process for the production of technically anhydrous or hydrated alkali detergent products by the reaction of an alkali sub-silicate containing a relatively high ratio of alkali oxide to silicon dioxide, and a compound capable of reacting with the alkali oxide thereof to form detergent materials with pH values in aqueous solution over a wide range, and possessing in addition, if desired, water-softening and buffering properties.

Still another object of the invention is to provide a process for making alkali sub-silicate products, which process, while it may utilize in part a solution of a furnace fused water glass, obviates the steps of seeding, crystallizing, and centrifuging, heretofore required in the production of such compounds as hydrated sodium metasilicate.

Still another object of the invention is to provide a homogeneous crystallized block of a hydrated product comprising an alkali sub-silicate or containing an alkali sub-silicate with other materials, which product is especially advantageous for use as a detergent in the industries.

Other objects, including the provision of the method for the production of the aforesaid block product, will be apparent from a consideration of the specification and claims.

The present invention contemplates in its broad aspects, the production of a detergent by the reaction of an alkali silicate having a relatively high ratio of alkali oxide to silica, and in any event having a ratio of alkali oxide to silica greater than 1 to 1, with a compound which reacts chemically with the alkali oxide of the silicate to form a product with a pH value in aqueous solution lower than that of the silicate reacted. Thus, it is possible by selecting the reactants, and the relative amounts thereof, to obtain detergent products with a desired pH value in aqueous solution over a wide range and possessing in addition, if desired, water-softening and buffering properties.

The term "alkali sub-silicate" as used herein includes those alkali silicate products whose alkali oxide content is not less than the acidic oxide content and the ratio of alkali oxide to silicon dioxide may vary from 1 to 1 upwards as desired to the limit of chemical combination, although the alkali sub-silicate of definite composition with the highest ratio of alkali oxide to silicon dioxide now established is the orthosilicate ($Na_4SiO_4$) whose alkali oxide content is double the silica content. The sesquisilicate ($Na_6Si_2O_7$) contains a ratio of alkali oxide to silica of 1.5 to 1. The sub-silicate with the lowest ratio of alkali oxide to silica is the metasilicate ($Na_2SiO_3$) which contains equimolecular parts of the two oxides. Mixed compounds are encountered when a sub-silicate product of a different ratio of alkali oxide to silica than those mentioned is present; thus a so-called base product is prepared by reacting 1.20 to 1.25 molecular parts of $Na_2O$ with 1 molecular part of $SiO_2$. Preferably, the sub-silicate employed will contain a ratio of alkali oxide to silicon dioxide at least equal to the so-called base product. Such products are included within the term "alkali sub-silicates having a relatively high ratio of alkali oxide to acidic oxide."

The sub-silicate employed in the process may be obtained from any available source, although it is advantageously produced by one of the processes described in our copending application Serial No. 15,722, filed April 10, 1935 (now Patent No. 2,083,-545), where solid caustic soda and silica are reacted, or Serial No. 101,322, filed September 17, 1936, where solid caustic alkali and solid water glass are reacted, or by the process described in the application of Richard Lloyd Davies Serial No. 99,309, filed September 3, 1936 (now Patent No. 2,100,944), where molten caustic alkali is reacted with silica or water glass. The compound which reacts chemically with the alkali oxide of the silicate may be added to the mixer after the reaction between the caustic alkali and the material furnishing the silica has taken place in the above processes to form the sub-silicate desired, either while the mass is plastic or after granulation. If a portion of the silica has not reacted, it is encountered in the detergent product as an insoluble material which may be of advantage when a detergent containing a scouring ingredient is desired. The sub-silicate reacted may also be the reacted product removed from the mixer or otherwise obtained as described in the applications mentioned, and it may be hydrated, for example, it may contain two molecules of water which corresponds to the initial product obtained by the said processes, or it may be technically anhydrous, such a product being obtained directly by the process of said Davies application, or by heating the initial product obtained by the processes of our above-identified applications to about 300° C. or higher.

The process may be carried out to form sodium, potassium, or mixed sodium and potassium compounds by using a sodium sub-silicate, and/or a potassium sub-silicate on the one hand, and a sodium and/or a potassium compound to react with the alkali oxide of the sub-silicate on the other. Since the products are primarily designed for use as detergents, and cheapness is a consideration, the invention will be described using a sodium sub-silicate and a sodium compound for reaction with the sodium oxide thereof as reactants, but it is to be understood that the equivalent potassium compounds may be used in a simliar manner.

The compound to be reacted with the alkali oxide of the sub-silicate may be water glass in which case a sub-silicate product of lower ratio of alkali oxide to silicon dioxide than the sub-silicate reacted will be produced or it may be any other material or materials capable of reacting with the alkali oxide to form a mixed product comprised of a silicate and any other valuable detergent material or assistants. Examples of such mixed products are those containing silicates and borates, silicates and carbonates, silicates and phosphates, silicates and soaps, and the like, or products which contain more than one compound of the type mentioned in addition to the silicates.

In any particular case, a compound will be selected which will react chemically with the alkali oxide of the sub-silicate to form the product desired, and the amounts of reactants employed will be chosen to give the desired distribution of the alkali oxide between the various acidic oxides of the composition and thus determine the properties of the detergent product including its pH value in aqueous solution. The amount of compound reacting with the alkali oxide of the sub-silicate will not be sufficient to result in the appreciable precipitation of silica when the composition is dissolved in water, and, therefore, in general, the amount reacted will not be in excess of that required to reduce the ratio of alkali oxide to silicon dioxide of the silicate below 1 to 1 which corresponds to the metasilicate. Herein and in the claims where ratios are specified, molecular ratios are contemplated.

The detergent product of the present invention may be associated with any desired amount of water of crystallization, or it may be technically anhydrous. If a technically anhydrous product is desired, the use of anhydrous reactants, or of products containing as low a water content as is practicable is recommended. To obtain a technically anhydrous product from a hydrated initial product, the latter may be dehydrated by heating it to a temperature sufficient to remove the water associated therewith, but below its melting point, for example, to a temperature from 200° C. to 400° C. When a hydrated product is desired, the amount of water required for the desired hydration may be added to the reactants if necessary to supplement any water associated therewith and formed as the result of the reaction.

The reaction may be brought about in any suitable equipment and will take place at room temperature in the presence of free moisture, or at a moderate temperature. The reactions are exothermic, and, therefore, heat is liberated as the reaction proceeds. Preferably, the reaction is carried out in a mixing device in order to insure intimate contact between the reactants. In the case where water is present in relatively small amounts during the reaction, as is preferably the case where a technically anhydrous product is desired, the product remains more or less in a solid condition. In the production of a relatively highly hydrated product, however, the reacting mixture is converted into a mass of thin, pasty consistency which, as the reaction proceeds, thickens. The mixing can be continued preferably with cooling of the mixer to produce a granular, free-flowing material which may be discharged from the mixer, or the thickened pasty mass may be flowed into molds to obtain solidified, crystallized blocks of any desired size. The product may be made available to the trade in this form or the blocks may be crushed to form a granular, free-flowing material. The formation of blocks and the sale of these for use in commercial detergent operations is particularly advantageous since the product may be used with great efficiency. In the continuous mechanical type of washing machines, for example, the blocks pass into solution more slowly than the powdered or granular material so that better control of the hydrogen ion concentration of the detergent solution and more uniform conditions are afforded. When there is present in the reacting mixture water-softening or buffering materials, the hydrated product is characterized by its homogeneity and the fact that the alkali sub-silicate and the other substance or substances exist in a solidified co-crystallized form.

Referring to the conversion of an alkali sub-silicate of a relatively high ratio of alkali oxide to silicon dioxide to a sub-silicate of lower ratio by the use of water glass, the water glass employed is preferably liquid, and may be any liquid alkali oxide-silica product where the silica exceeds the alkali oxide molecularly. Its ratio of silica to alkali oxide will determine the amount to be employed in the conversion of any particular alkali sub-silicate with a relatively high ratio of alkali oxide to silica to the desired sub-silicate of lower ratio of alkali oxide to silica. Thus, the alkali sesquisilicate may be formed by reaction of the orthosilicate with liquid water glass; the metasilicate may be obtained by reaction of the ortho- or sesquisilicates, or an intermediate product, such as the so-called base product, with liquid water glass; and mixed sub-silicate products may be made available by reacting the alkali sub-silicates of relatively high oxide content with an appropriate amount of liquid water glass.

In the preparation of a product containing a small amount of water, or of a technically anhydrous product, the use of an anhydrous solid sub-silicate and concentrated liquid water glass is preferable. Care should be taken if a technically anhydrous product is to be obtained, to avoid the presence of an excess of water in the reaction products, for example water in excess of 2 to 2½ mols, due to the fact that products containing excess of water are difficult, if not impossible, to dehydrate because of the undesirable physical properties resulting. Thus, while the technically anhydrous metasilicate can be formed by the dehydration of a product obtained by reacting the anhydrous sesquisilicate, or anhydrous products having a lower ratio of alkali oxide to silicon dioxide, with water glass, difficulty is encountered in the formation of the anhydrous metasilicate from the orthosilicate due to the excess water supplied by the liquid water glass. If the orthosilicate is employed, the reaction is preferably carried on in two or more steps with intermediate dehydration of the product to remove the excess water; for example, the orthosilicate can be converted to the sesquisilicate which is then dehydrated, and the anhydrous sesquisilicate thus formed may be converted to the anhydrous metasilicate, or to the anhydrous base material which in turn is converted to the anhydrous metasilicate.

In a typical example for the production of a technically anhydrous metasilicate, solid technically anhydrous sodium sesquisilicate, or the technically anhydrous sodium base product which corresponds approximately to a mixture of equal parts of sodium metasilicate and sodium sesquisilicate, is treated with the necessary amount of liquid sodium water glass of suitable composition to bring the ratio of alkali oxide to silica to that corresponding to the metasilicate. The sub-silicate and the liquid water glass are added to the blending mixer to insure thorough mixing and the mechanical mixing is continued until the reaction is complete which will proceed without the application of heat and which is complete within five to ten minutes. The granular product, while it may be marketed for technical uses, is passed through a drier heated to a temperature in the neighborhood of 200° C. to form a free-flowing product corresponding substantially to the formula $Na_2SiO_3$.

The following are examples of the preparation of sodium metasilicate pentahydrate $$(Na_2SiO_3 \cdot 5H_2O),$$

it being understood that other hydrated products may be formed by properly proportioning the amount of water available during the reaction.

*Example a*

Parts of base material ($Na_2O$—52%; $SiO_2$—43.8%) _____ 100
Parts of water glass ($Na_2O$—9.0%; $SiO_2$—29.9%; $H_2O$—61%) _____ 30
Parts of added water_____ 55

*Example b*

Parts of anhydrous sodium sesquisilicate____ 100
Parts of liquid water glass (same composition as Example a) _____ 80
Parts of added water_____ 40

*Example c*

Parts of anhydrous sodium orthosilicate_____ 100
Parts of liquid water glass (same composition as Example a) _____ 140
Parts of added water_____ 15

In each of the three examples, the materials are mixed until the temperature rises to about 70-85° C. The stirring is continued until the temperature has fallen to about 45° C., at which point the product is poured into shallow pans about one inch deep and allowed to solidify. At the end of about one hour, the material sets to a hard cake or block and is either used in that form or is crushed to a granular free-flowing product. The product has the following composition: $Na_2O$ 28.2%, $SiO_2$ 27.3%, $H_2O$ 41.9%, which approaches the theoretical composition of a pure sodium metasilicate pentahydrate. The product obtained is readily soluble in water and finds wide applicability for use in the industries, particularly as a detergent. If instead of pouring the fluid product into shallow pans for solidification, the stirring is continued and the temperature lowered, a granular free-flowing product is obtained which may be used as discharged from the mixer.

The process of the present invention for the production of sodium metasilicate pentahydrate where the product is synthesized in the mixing device, the correct amount of water being added to form a solid hydrated product without the use of fuel for evaporation and without an extensive and expensive plant is to be contrasted to the previous methods of preparing the product. The generally accepted method of producing a metasilicate involves mixing silica and soda ash in proper proportions in a furnace and fusing the ingredients. The fused product is poured from the furnace, chilled, dissolved, evaporated, adjusted to the proper alkalinity with caustic soda, seeded, crystallized, centrifuged, dried, and comminuted. The process of the present invention, while utilizing in part a solution of the silicate produced in the fusion furnace, dispenses with the crystallizing tanks, centrifuging machines, and like equipment necessary to produce the product.

If a product containing a borate is desired, boric acid or any borate having a lower ratio of $Na_2O$ to $B_2O_3$ than the alkali borate formed as the result of the reaction may be used. Thus, borax ($Na_2B_4O_7 \cdot 10H_2O$) or any compound of this type of lower hydration, or a borate, natural or synthetic, containing a higher molecular content of $B_2O_3$ than $Na_2O$, for example, the mineral raserite may be employed. In a particular instance, a raserite having an analysis of $Na_2O$ 20.18%; $B_2O_3$ 46.08%; water 26.82% with small quantities of silica and lime reacted satisfactorily and in the same manner as borax. In this case, the impurities appear as insoluble material in the finished product. These borates and boric acid are included herein with the term "an alkali (sodium) borate having a molecular ratio of $B_2O_3$ to alkali oxide ($Na_2O$) greater than 1 to 1".

In typical examples, 382 parts of borax are stirred in a mixer with 312 parts of anhydrous sodium sesquisilicate, or 189 parts of anhydrous sodium orthosilicate. After a few minutes stirring, the temperature rises to about 60° to 70° C., and while the mass appears moist at first, agglomeration takes place. The mass is discharged from the mixer and is spread out to cool and dry. After a few hours, the material can be disintegrated and a dry, free-flowing granular product results. The above reactions are hastened if about 1% of water (calculated on the weight of the mixture) is added to the charge in the mixer, particularly if partially dehydrated borate materials are employed. The reactions may be represented by the following equations:

$$Na_6Si_2O_7 + Na_2B_4O_7 \cdot 10H_2O = 2Na_2SiO_3 \cdot xH_2O + 4NaBO_2 \cdot yH_2O, \text{ where } x+y=10$$

$$Na_4SiO_4 + Na_2B_4O_7 \cdot 10H_2O = Na_2SiO_3 \cdot xH_2O + 4NaBO_2 \cdot yH_2O, \text{ where } x+y=10$$

When the products are dissolved in water, solutions are obtained which are below, and in general well under, those of the sodium silicate reacted in regard to pH characteristics. The solutions of the product prepared as described in the specific examples possess advantages over soda ash or trisodium phosphate since they do not attack aluminum or tin, and maintain a higher pH level during neutralization than do solutions of either of the named chemicals. The products have proved desirable as domestic and general cleansers and are less harsh in contact with the hands than soda ash, trisodium phosphate, and the like.

It will be understood that various other mixed silicate-borate products may be obtained by the processes herein disclosed by using other ratios of the various sub-silicates and borates, and that highly hydrated products in granular or block form containing mixed silicate-borate products may be obtained, if desired, by adding the appropriate amount of water to the mixer, in which case the physical conditions previously described will take place.

To form a mixed silicate-carbonate product, sodium bicarbonate or carbon dioxide may be reacted with the alkali sub-silicate. The sodium bicarbonate may be used in the process in a manner corresponding to that described where borax was employed. In typical examples, 84 parts of sodium bicarbonate are stirred in a mixer with 156 parts of anhydrous sodium sesquisilicate, or 168 parts of sodium bicarbonate and 189 parts of anhydrous sodium orthosilicate. After a few minutes stirring, the temperature rises to about 60° to 70° C. or higher, and the mixture appears to be damp, followed by definite granulation of the mass. Preferably, however, a small amount of water, for example 2% to 5% based on the total weight of the mixture is added to initiate the reaction and to decrease the mixing time. The mass is discharged from the mixer and is stored in suitable containers during which time the reaction is completed and the product is cooled. Thereafter, the product is screened and repacked.

In typical examples for the production of a relatively highly hydrated mixed silicate-carbonate product, 84 parts of sodium bicarbonate are added to a mixer with 156 parts of anhydrous sesquisilicate and 108 parts of water, or 168 parts of sodium bicarbonate and 189 parts of anhydrous sodium orthosilicate and 126 parts of water. The materials are mixed and the temperature rises to about 100° C. with the production of a thin slurry which upon further agitation becomes thicker. The stirring is continued until a thick slurry results accompanied by a drop in temperature, and the mass is then discharged from the mixer into cooling pans or molds to form the co-crystallized product which is substantially non-deliquescent and non-hydroscopic under normal atmospheric conditions. The product may be crushed or ground to form a free-flowing granular material.

Various other mixed silicate-carbonate products may obviously be obtained by using other ratios of the various sub-silicates and bicarbonate. Corresponding products may be obtained by substituting carbon dioxide and moisture to yield carbonic acid, in place of the bicarbonate. When carbon dioxide is used, however, the reaction vessel must be adapted to provide for contact between the gas and the sub-silicate.

Phosphoric acid, monosodium phosphate or disodium phosphate, if mixed and reacted with the sub-silicate, will furnish mixed silicate-phosphate products, and products containing soap may be prepared by reacting a fatty acid, such as stearic or oleic acid, with the sub-silicate. In this latter case, the reaction preferably is carried out where there is a high ratio of $Na_2O$ to $SiO_2$ in the sub-silicate, since otherwise the reaction tends to be incomplete.

Mixed products may also be formed by reacting the sub-silicate with more than one reactant, for example with both the borate and the bicarbonate. The following are examples of this type of process where both liquid water glass and another reactant are used:

*Example d*

| | |
|---|---|
| Parts of sodium sesquisilicate | 100 |
| Parts of liquid water glass (same composition as Example a) | 60 |
| Parts of mono-sodium phosphate ($NaH_2PO_4 \cdot H_2O$) | 10 |
| Parts of water | 51 |

*Example e*

| | |
|---|---|
| Parts of sodium sesquisilicate | 100 |
| Parts of liquid water glass (same composition as Example a) | 60 |
| Parts of sodium bicarbonate | 12.5 |
| Parts of water | 47 |

The reaction is brought about under the same conditions of temperature and stirring as is given above with respect to Examples a to c. The product formed in Example d has the following composition: $Na_2O$ 28.40%, $SiO_2$ 24.20%, $P_2O_5$ 2.3%, and water (by difference) 45.07%. The product in Example e analyzed as follows: $Na_2O$ 30.40%, $SiO_2$ 24.30%, $CO_2$ 2.96%, and water (by difference) 42.34%. The product obtained may be in the form of a crystallized block or of granules of the sodium sub-silicate product in which the sodium sub-silicate and sodium phosphate or sodium carbonate are homogeneously distributed therethrough in a co-crystallized condition.

It has been pointed out that materials imparting water-softening and buffering properties to the sub-silicate product may be furnished to the product by supplementing a portion of the water glass with a material capable of reacting with the alkali oxide of the sub-silicate. If desired, non-reacting materials possessing these properties may be added to or incorporated with the sub-silicate at any stage of the process or subsequent thereto. Preferably, they are present in the reacting mixture since in this case a homogeneous product is obtained which is superior to the mechanical mixtures generally available. When a hydrated product is formed, as hereinbefore described, the reacting materials and the non-reactive materials added thereto are uniformly distributed in the product in a co-crystallized condition. Examples of non-reacting materials which may be associated with the sub-silicate are the alkali-metal carbonates; the various alkali-metal phosphates, such as the tri-alkali-metal phosphates, the alkali-metal metaphosphates, the alkali-metal hexametaphosphates; and the alkali-metal acetates. It is to be understood, however, that where the ratio of alkali oxide to acidic oxide in the sub-silicate product is referred to in this specification or the claims, the ratio of the alkali oxide to acidic oxide present in the non-reacting ingredients is not included.

As has been pointed out, insoluble abrasive material may be present in the finished product if desired by having present therein unreacted silica. Silica, pumice, volcanic ash, and the like may also be added to the reaction mixture to furnish an abrasive ingredient, if desired.

Considerable modification is possible in the alkali sub-silicate reacted and in the selection and proportions of the chemicals reactive therewith, as well as in the steps of the method of carrying out the reaction, without departing from the essential features of the invention.

We claim:

1. The process of making a sodium silicate-containing product capable of use as a detergent comprising a reaction product whose molecular ratio of $Na_2O$ to acidic oxide is from approximately 1 to 1 to 2 to 1, which comprises mixing together a sodium sub-silicate, containing a higher molecular ratio of $Na_2O$ to acidic oxide than 1 to 1 and higher than that of the product desired, and a sodium compound selected from the group consisting of water glass, sodium bicarbonate, monosodium phosphate, disodium phosphate, and alkali borate having a molecular ratio of $B_2O_3$ to sodium oxide greater than 1 to 1, the said reactants being present in such molecular proportions that the ratio of $Na_2O$ to acidic oxide of said reactants in the reaction mixture is approximately from 1 to 1 to 2 to 1, and reacting said sodium sub-silicate and said sodium compound to form said product.

2. The process of making a sodium silicate-containing product capable of use as a detergent comprising a reaction product whose molecular ratio of $Na_2O$ to acidic oxide is from approximately 1 to 1 to 2 to 1, which comprises mixing together, in the absence of sufficient water to dissolve a substantial portion of the reactants, a sodium sub-silicate, containing a higher molecular ratio of $Na_2O$ to acidic oxide than 1 to 1 and higher than that of the product desired, and a sodium compound selected from the group consisting of water glass, sodium bicarbonate, monosodium phosphate, disodium phosphate, a sodium borate having a molecular ratio of $B_2O_3$ to sodium oxide greater than 1 to 1, the reactants being present in such molecular proportions that the ratio of $Na_2O$ to acidic oxide of said reactants in the reaction mixture is approximately from 1 to 1 to 2 to 1, and reacting said sodium sub-silicate and said sodium compound while stirring the mixture to form said product.

3. The process of making a technically anhydrous sodium silicate-containing product capable of use as a detergent comprising a reaction product whose molecular ratio of $Na_2O$ to acidic oxide is from approximately 1 to 1 to 2 to 1, which comprises mixing together, in the absence of sufficient water to dissolve a substantial portion of the reactants, a technically anhydrous sodium sub-silicate containing a higher molecular ratio of $Na_2O$ to acidic oxide than 1 to 1 and higher than that of the product desired, and a sodium compound selected from the group consisting of water glass, sodium bicarbonate, monosodium phosphate, disodium phosphate, a sodium borate having a molecular ratio of $B_2O_3$ to sodium oxide greater than 1 to 1, the reactants being present in such molecular proportions that the ratio of $Na_2O$ to acidic oxide of said reactants in the reaction mixture is approximately from 1 to 1 to 2 to 1, reacting said sodium sub-silicate and said sodium compound while stirring the mixture to form said product, and thereafter heating said product to obtain said technically anhydrous sodium silicate-containing product.

4. The process of making a hydrated sodium silicate-containing product capable of use as a detergent comprising a reaction product whose molecular ratio of $Na_2O$ to acidic oxide is from approximately 1 to 1 to 2 to 1, which comprises mixing together a sodium sub-silicate containing a higher molecular ratio of $Na_2O$ to acidic oxide than 1 to 1 and higher than that of the product desired and a compound selected from the group consisting of water glass, sodium bicarbonate, monosodium phosphate, disodium phosphate, a sodium borate having a molecular ratio of $B_2O_3$ to sodium oxide greater than 1 to 1, in the presence of sufficient water to form a pasty flowable reaction product, the molecular proportion of $Na_2O$ to acidic oxide of said reactants in the reaction mixture being approximately from 1 to 1 to 2 to 1 and the amount of water present corresponding to that of the hydrate desired, reacting said sodium sub-silicate and said sodium compound while stirring the mixture to form said product, and thereafter solidifying said reaction product.

5. The process of making sodium metasilicate capable of use as a detergent which comprises mixing together a sodium sub-silicate containing a higher molecular ratio of sodium oxide to silicon dioxide than the metasilicate, and water glass, the reactants being present in such molecular proportions that the ratio of $Na_2O$ to silicon dioxide in the reaction mixture is approximately 1 to 1, and reacting said sodium sub-silicate and water glass to form said product.

WALTER S. RIGGS.
CLARENCE W. BURKHART.